(12) United States Patent
Wu et al.

(10) Patent No.: US 12,274,300 B2
(45) Date of Patent: Apr. 15, 2025

(54) HEATING DEVICE

(71) Applicant: SHENZHEN FIRST UNION TECHNOLOGY CO., LTD., Shenzhen (CN)

(72) Inventors: Jian Wu, Shenzhen (CN); Zuqiang Qi, Shenzhen (CN); Baoling Lei, Shenzhen (CN); Zhongli Xu, Shenzhen (CN); Yonghai Li, Shenzhen (CN)

(73) Assignee: SHENZHEN FIRST UNION TECHNOLOGY CO., LTD., Guangdong (CN)

( * ) Notice: Subject to any disclaimer, the term of this patent is extended or adjusted under 35 U.S.C. 154(b) by 425 days.

(21) Appl. No.: 17/758,885

(22) PCT Filed: Jan. 15, 2021

(86) PCT No.: PCT/CN2021/072244
§ 371 (c)(1),
(2) Date: Jul. 15, 2022

(87) PCT Pub. No.: WO2021/143872
PCT Pub. Date: Jul. 22, 2021

(65) Prior Publication Data
US 2023/0033346 A1   Feb. 2, 2023

(30) Foreign Application Priority Data
Jan. 16, 2020  (CN) .......................... 202020095231.6

(51) Int. Cl.
*A24F 40/46* (2020.01)
*A24F 40/70* (2020.01)

(52) U.S. Cl.
CPC .............. *A24F 40/46* (2020.01); *A24F 40/70* (2020.01)

(58) Field of Classification Search
CPC ...................................................... A24F 40/46
See application file for complete search history.

(56) References Cited

U.S. PATENT DOCUMENTS

2019/0098935 A1 * 4/2019 Phan .................. C03C 4/02
2019/0350257 A1   11/2019 Sur

FOREIGN PATENT DOCUMENTS

| CN | 102329086 A | 1/2012 |
| CN | 204335822 U | 5/2015 |

(Continued)

*Primary Examiner* — Christopher M Rodd
*Assistant Examiner* — Jennifer A Kessie
(74) *Attorney, Agent, or Firm* — Proi Intellectual Property US

(57) ABSTRACT

A heating device, used for heating an aerosol generating substrate to form an aerosol, comprises a heating body, wherein the heating body comprises a base body configured to have a chamber for receiving at least part of the aerosol generating substrate and further comprises an infrared radiation coating formed on the outer surface of the chamber and used for generating infrared rays after a temperature rise and transmitting energy to the aerosol generating substrate in the chamber at least in an infrared radiation manner, so that at least one component in the aerosol generating substrate is volatilized to form an aerosol, wherein the surface roughness of the outer surface of the chamber is greater than the surface roughness of the inner surface of the chamber. A rough surface is formed at an interface between the outer surface of the base body and the infrared electrothermal coating.

20 Claims, 4 Drawing Sheets

(56) References Cited

FOREIGN PATENT DOCUMENTS

| | | |
|---|---|---|
| CN | 107637862 A | 1/2018 |
| CN | 107637862 U | 1/2018 |
| CN | 109832674 A | 6/2019 |
| CN | 109846093 A | 6/2019 |
| CN | 209120496 U | 7/2019 |
| CN | 209573235 U | 11/2019 |
| CN | 212117075 U | 12/2020 |

* cited by examiner

HEATING DEVICE

CROSS REFERENCE TO RELATED APPLICATION(S)

This application claims priority to Chinese Patent Application No. 202020095231.6, entitled "Heating device" and submitted to China National Intellectual Property Administration on Jan. 16, 2020, the entire content of which is incorporated herein by reference.

TECHNICAL FIELD

The present disclosure relates to the technical field of smoking sets, and in particular to a heating device, which is configured for heating an aerosol generating substrate to volatilize at least one ingredient therein to form an aerosol for a user to inhale.

BACKGROUND

Traditional smoking products such as cigarettes and cigars are burning tobaccos to produce tobacco smoke for people to inhale during usage. During the process of burning, the smoking products, while volatilizing effective ingredients such as nicotine, will generate toxic and carcinogenic substances such as tar and carbon monoxide due to incomplete combustion. These substances have been proved to be the main cause of health problems of smokers. People have attempted to produce products that release compounds such as nicotine without burning to substitute those tobacco products burning tobaccos so as to reduce the hazard of smoking. An example of this kind of products is a so called heating nonburning product, which heats rather than burns a smoking product to release effective compounds such as nicotine. Due to non-combustion, those toxic and carcinogenic substances such as tar and carbon in the smoke will be greatly reduced.

Infrared heating tube for low-temperature smoke is a novel heating component for low-temperature smoke. A surface of the heating tube is plated with an infrared electrothermal film, for example, an ATO film, through methods such as chemical vapor deposition, and the infrared electrothermal film generates heat through electrification and then heats the smoking product in the tube by converting the heat into the form of infrared radiation. Such a heating mode to heat a smoke product, compared to a conventional heat conduction heating mode, achieves better mouthfeel and smoke volume. The reason is that infrared heating has better uniformity of temperature field and certain penetrability, which enables materials such as tobacco in the smoking product to be almost heated by infrared radiation together.

Smoking sets employing the above structure have the following problems. The infrared electrothermal coating radiates infrared rays at the periphery of the smoking product, however, when the infrared coating radiates infrared rays towards the smoking product inside the base body, due to the existence of the base body, a reflecting interface exists at the interface between the infrared electrothermal coating and the base body, causing part of the infrared rays to be reflected, thus reducing the transmissivity and emissivity of the infrared rays, reducing the utilization of power source of the infrared electrothermal coating, impacting the preheating speed and smoke generation peed of the smoke product, and reducing user experience.

SUMMARY

In order to solve the problem of low efficiency of utilization of power source in existing technologies and to improve user experience, the present disclosure provides a heating device.

The present disclosure provides a heating device, configured for heating an aerosol generating substrate to volatilize at least one ingredient therein to form an aerosol, including a heating body, wherein the heating body includes:

a base body, which is configured to have a chamber for receiving at least part of the aerosol generating substrate; and an infrared radiation coating, which is formed on an outer surface of the chamber and configured for generating infrared rays after a temperature rise and transmitting energy to the aerosol generating substrate received within the chamber at least in an infrared radiation manner, so that at least one ingredient in the aerosol generating substrate is volatilized to form an aerosol;

a surface roughness of the outer surface of the chamber being greater than a surface roughness of an inner surface of the chamber.

Further, the base body is in the shape of a tube, and the inner surface of the base body forms the chamber.

Further, the outer surface of the chamber is an irregular rough surface.

Further, the irregular rough surface is a rough surface formed by machining or chemical corrosion or laser etching.

Further, the outer surface of the chamber is a basically regular rough surface.

Further, the basically regular rough surface includes a plurality of protrusions distributed in an array.

Further, the basically regular rough surface includes a plurality of recesses distributed in an axial direction or a circumferential direction.

Further, the base body is made of quartz glass.

Further, the infrared radiation coating is an infrared electrothermal coating which is configured to receive an electric power to raise temperature so as to radiate infrared rays, and the device further includes an electrode coating which is electrically connected to the infrared electrothermal coating and configured to convey power supply to the infrared electrothermal coating.

Further, the heating device includes a reflection element and/or heat insulation element, wherein the reflection element and/or heat insulation element are/is disposed at the circumferential periphery of the heating body to prevent dissipation of at least partial heat towards the periphery of the heating body.

Further, the heat insulation element includes a vacuum tube, an aerogel tube, an aerogel felt or a porous polyurethane layer.

Further, the reflection element includes a reflection coating, or includes a metal tube, the metal tube has a smooth inner surface, and the reflection element may also be an ITO layer.

According to the principle of infrared radiation, Emissivity+Reflectivity+Transmittivity=1. Therefore, in order to improve the power efficiency of the infrared heating body, the reflectivity may be reduced, for example, reducing the reflectivity of the surface by roughening the reflecting surface. According to the present disclosure, an unsmooth surface is prepared at the outer surface of the base body, that is, at an interface between the infrared electrothermal coating and the base body, so that the reflection of the infrared rays emitted by the infrared electrothermal coating at the interface is reduced, and the objective of improving the power efficiency can be achieved.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form proportional restrictions unless otherwise stated.

DETAILED DESCRIPTION

The present disclosure will become better understood from a more detailed description of the present disclosure below taken in conjunction with drawings and particular embodiments. It is to be noted that when an element is described as "fixed to" another element, it may be directly on the another element, or there might be one or more intermediate elements between them. When one element is described as "connected to" another element, it may be directly connected to the another element, or there might be one or more intermediate elements between them. Terms such as "upper", "lower", "left", "right", "inner", "outer", etc. used in the description and similar expressions are merely for the purpose of illustration.

Unless otherwise defined, all technical and scientific terms used in this description have the same meaning as those normally understood by the skill in the technical field of the present disclosure. The terms used in this description of the present disclosure are just for the purpose of describing particular embodiments, rather than limiting the present disclosure. Terms "and/or" used in the present disclosure include any and all combinations of one or more listed items.

The present disclosure is described below in detail in conjunction with drawings. What is described is merely as an aid to understanding of the present disclosure, rather than limiting the present disclosure to the described coverage.

Figure 1:
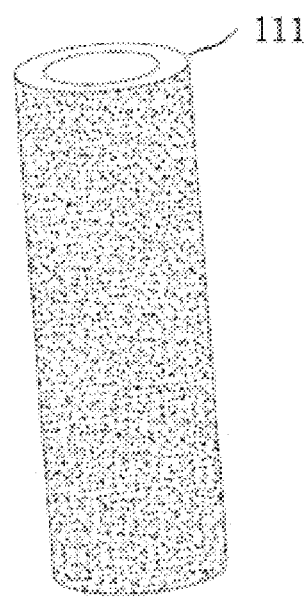
FIG. 1 is a diagram of a base body with an irregular rough surface according to the present disclosure.

FIG. 1 shows a base body 111 of a heating body according to one embodiment of the present disclosure. The base body is a quartz glass tube; the quartz glass tube is a circular tube and an inside there of forms a chamber for receiving a smoking product, an inner surface of the quartz glass tube is a smooth surface, and an outer surface thereof forms a rough surface through roughening.

An infrared radiation coating is formed on the rough surface; in the present embodiment, the infrared radiation coating is an infrared electrothermal coating, which receives a power supply to raise temperature so as to emit infrared rays; it is understandable that the infrared radiation coating may also be electrically insulated and raise temperature through an additional heating device. The infrared electrothermal coating in the present embodiment is a tin oxide coating doped with stibium and is deposited on the outer surface of the base body through a thermal spraying process.

The rough surface of the base body may be an irregular rough surface, which may be formed by conventional machining methods, for example, by methods of mechanical grinding or chemical corrosion or laser etching.

Figure 2:
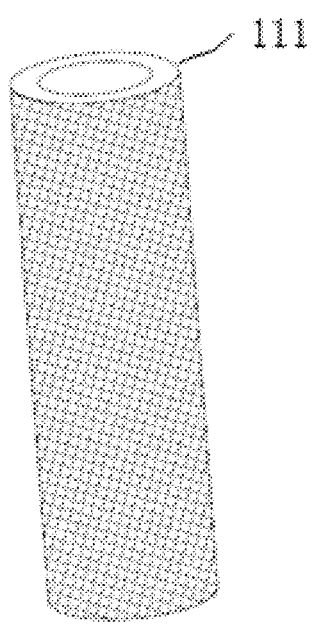
FIG. 2 is a diagram of a base body with a regular rough surface.
Figure 3:
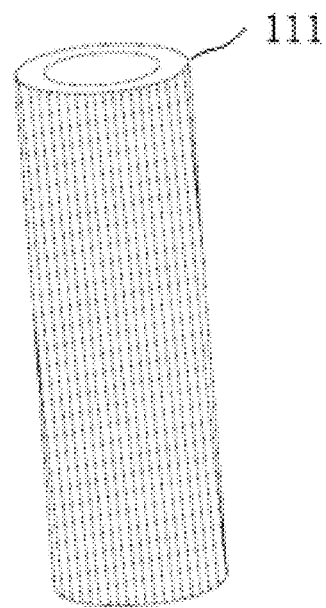
FIG. 3 is a diagram of a base body with another regular rough surface.

FIG. 2 to FIG. 3 show a base body 111 of a heating body according to another embodiment of the present disclosure. The rough surface of the base body 111 may be a regular rough surface, for example, including protrusions distributed in an array, wherein the protrusion may be a polygon, or may be shaped as a pyramid; for another example, including recesses densely arranged on the outer surface in the axial direction or circumferential direction, etc.; the regular rough surface may be prepared by methods of mechanical embossing or laser cauterization, etc.

Figure 4:
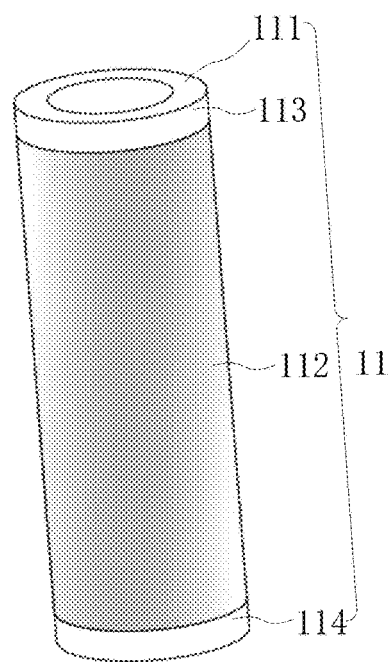
FIG. 4 is a diagram of a heating body according to one embodiment of the present disclosure.

FIG. 4 shows a heating body 11 including a base body 111 of the present disclosure. The heating body 11 further includes an infrared electrothermal coating 112 disposed on the outer surface of the base body 111, and a first electrode 113 and a second electrode 114 electrically connected to the infrared electrothermal coating 112.

In another embodiment, the first electrode 113 and the second electrode 114 may further include electrode strips that are disposed opposite to one another and extend in the longitudinal direction of the base body 111; the electrode strips enable the current input through the electrode to flow in the circumferential direction of the infrared electrothermal coating 112.

Figure 5:
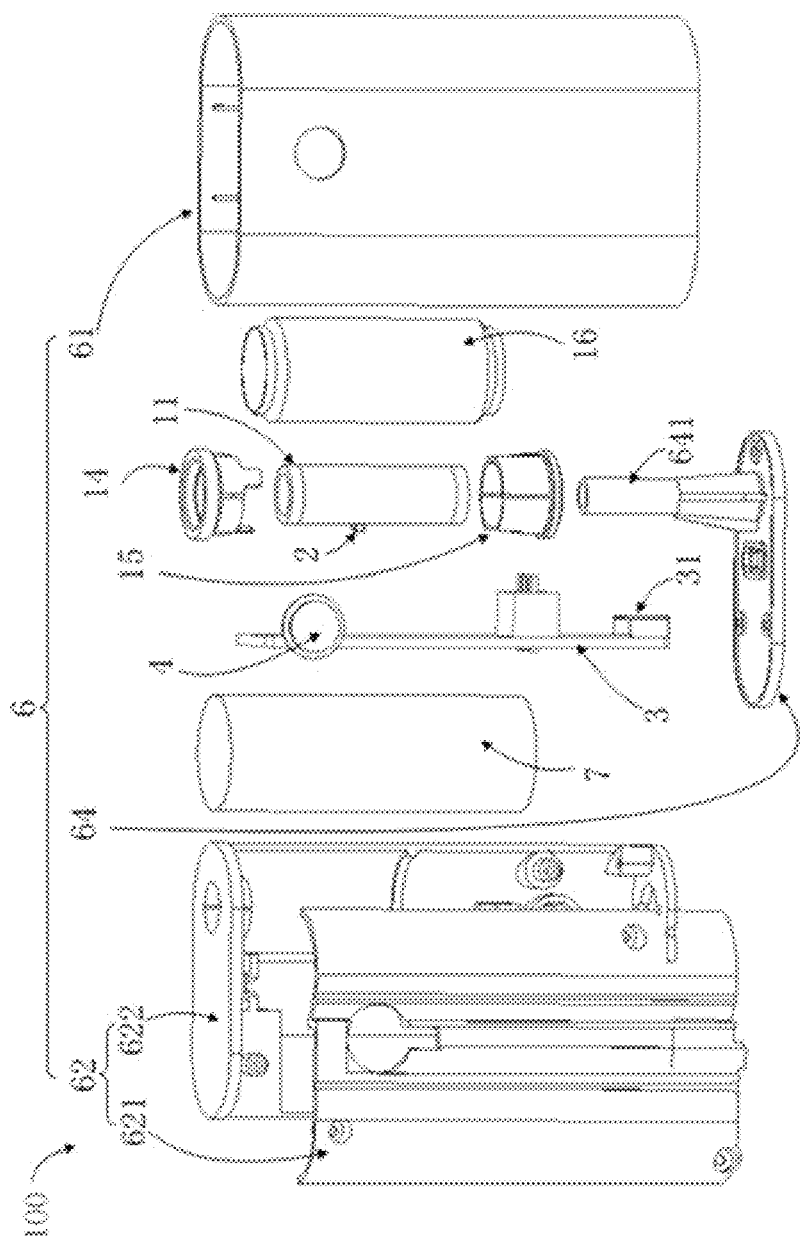
FIG. 5 is an exploded view of a heating device according to the present disclosure.

FIG. 5 shows a heating device 100 according to an embodiment of the present disclosure. The heating device 100 includes a shell assembly 6 and the above heating body 11, and the heating body 11 is arranged within the shell assembly 6. In the heating device 100 according to the present embodiment, an outer surface of the base body 111 is provided with an infrared electrothermal coating 112, and a first electrode 113 and a second electrode 114 electrically connected to the infrared electrothermal coating 112; the infrared electrothermal coating 112 may emit infrared rays to heat, in a manner of radiation, the aerosol generating substrate in the chamber of the base body 111.

The shell assembly 6 includes an outer shell 61, a fixing shell 62, a fixing seat (14, 15) and a bottom cover 64. The fixing shell 62 and the fixing seat (14, 15) are both fixed within the outer shell 61, wherein the fixing seat (14, 15) is configured for fixing the base body 111, the fixing seat (14, 15) is arranged within the fixing shell 62, the bottom cover 64 is arranged on one end of the outer shell 61 and covers the outer shell 61. Specifically, the fixing seat (14, 15) includes an first fixing seat 14 and a second fixing seat 15, both of the first fixing seat 14 and the second fixing seat 15 are arranged within the fixing shell 62, a first end and a second end of the base body 111 are fixed on the first fixing seat 14 and the second fixing seat 15 respectively, the bottom cover 64 is provided with an air inlet tube 641 in a protruding manner, one end of the second fixing seat 15 away from the first fixing seat 14 is connected to the air inlet tube 641, wherein the first fixing seat 14, the base body 111, the second fixing seat 15 and the air inlet tube 641 are arranged coaxially, meanwhile, the base body 111 is sealed with the first fixing seat 14 and the second fixing seat 15, the second fixing seat 15 is also sealed with the air inlet tube 641, the air inlet tube 641 is communicated with external air to facilitate smooth inlet of air during the smoking process.

The heating device 100 further includes a master control circuit board 3 and a battery 7. The fixing shell 62 includes a front shell 621 and a rear shell 622, the front shell 621 is fixedly connected to the rear shell 622, both of the master control circuit board 3 and the battery 7 are arranged within the fixing shell 62, the battery 7 is electrically connected to the master control circuit board 3, a button 4 is protruded and arranged on the outer shell 61 and is electrically connected to the master control circuit board 3, and the infrared electrothermal coating 112 on the surface of the base body 111 may be powered on or powered off by pressing the button 4. The master control circuit board 3 is further connected to a charging interface 31, the charging interface 31 is exposed on the bottom cover 64, and a user may charge or upgrade the heating device 100 through the charging interface 31 to ensure the continued usage of the heating device 100.

The heating device 100 further includes a heat insulation element 16; in the present embodiment, the heat insulation element 16 is a hollow heat insulation tube, preferably, a vacuum heat insulation tube with the inner air pressure less than the ambient pressure, the heat insulation element 16 is arranged within the fixing shell 62, and the heat insulation element 16 is sleeved on outside of the base body 111, thereby being capable of preventing a large amount of heat being transferred to the outer shell 61 to cause a hot feeling for the user. The heat insulation element 16 may also be internally provided with an infrared reflection coating or embedded with a reflection element, so as to reflect the infrared rays emitted by the infrared electrothermal coating 112 formed on the base body 111 back to the infrared electrothermal layer, thereby increasing the heating efficiency.

The heating device 100 further includes an NTC temperature sensor 2, which is configured to detect the real-time temperature of the base body 111 and transmit the detected real-time temperature to the master control circuit board 3, then the master control circuit board 3 adjusts the amplitude of the electric power fed to the infrared electrothermal coating 112 according to the real-time temperature. Specifically, when the NTC temperature sensor 2 detects that the real-time temperature inside the base body 111 is relatively low, for example, when detecting that the temperature inside the base body 111 is lower than 150° C., the master control circuit board 3 controls the battery 7 to output a higher voltage to the electrode, thereby increasing the current fed to the infrared electrothermal coating 112, increasing the heating power of the aerosol generating substrate and reducing the time the user needs to wait before taking the first puff. When the NTC temperature sensor 2 detects that the temperature of the base body 111 is 150° C. to 200° C., the master control circuit board 3 controls the battery 7 to output a low maintenance voltage to the electrode. When the NTC temperature sensor 2 detects that the temperature inside the base body 111 is or above 250° C., the master control circuit board 3 controls the battery 7 to stop outputting a voltage to the electrode.

It is to be noted that the description of the present disclosure and the drawings just list preferred embodiments of the present disclosure. The present disclosure may, however, be exemplified in many different forms and should not be construed as being limited to the specific embodiments set forth herein. These embodiments are not intended to form extra limits to the content of the present disclosure, rather, they are provided so that this disclosure will be thorough and complete. Moreover, the above technical features may continue to combine with each other to form various embodiments not listed above, and these embodiments are all intended to be covered by the description of the present disclosure. Further, for the ordinary staff in this field, improvements or variations may be made according to the above description, and these improvements or variations are intended to be included within the scope of protection of the claims appended hereinafter.

What is claimed is:

1. A heating device, configured for heating an aerosol generating substrate to volatilize at least one ingredient therein to form an aerosol, comprising a heating body, wherein the heating body comprises:
   a base body, which is configured to have a chamber for receiving at least part of the aerosol generating substrate, a surface roughness of an outer surface of the chamber being greater than a surface roughness of an inner surface of the chamber; and
   an infrared radiation coating, which is formed on the outer surface of the chamber and configured for generating infrared rays after a temperature rise and transmitting energy to the aerosol generating substrate received within the chamber at least in an infrared radiation manner, so that at least one ingredient in the aerosol generating substrate is volatilized to form an aerosol.

2. The heating device according to claim 1, wherein the base body is in the shape of a tube, and an inside of the base body forms the chamber.

3. The heating device according to claim 1, wherein the outer surface of the chamber is an irregular rough surface.

4. The heating device according to claim 3, wherein the irregular rough surface is a rough surface formed by machining or chemical corrosion or laser etching.

5. The heating device according to claim 1, wherein the outer surface of the chamber is a basically regular rough surface.

6. The heating device according to claim 5, wherein the basically regular rough surface comprises a plurality of protrusions distributed in an array.

7. The heating device according to claim 5, wherein the basically regular rough surface comprises a plurality of recesses distributed basically in an axial direction or a circumferential direction.

8. The heating device according to claim 1, wherein the base body is made of quartz glass.

9. The heating device according to claim 8, wherein the infrared radiation coating is an infrared electrothermal coating which is configured to receive an electric power to raise temperature so as to radiate infrared rays, and the device further comprises an electrode coating which is electrically connected to the infrared electrothermal coating and configured to convey power supply to the infrared electrothermal coating.

10. The heating device according to claim 9, further comprising a reflection element and/or heat insulation element, wherein the reflection element and/or heat insulation element are/is disposed at the circumferential periphery of the heating body to prevent dissipation of at least partial heat towards the periphery of the heating body.

11. The heating device according to claim 2, wherein the outer surface of the chamber is an irregular rough surface.

12. The heating device according to claim 11, wherein the irregular rough surface is a rough surface formed by machining or chemical corrosion or laser etching.

13. The heating device according to claim 2, wherein the outer surface of the chamber is a basically regular rough surface.

14. The heating device according to claim 13, wherein the basically regular rough surface comprises a plurality of protrusions distributed in an array.

15. The heating device according to claim 13, wherein the basically regular rough surface comprises a plurality of recesses distributed basically in an axial direction or a circumferential direction.

16. The heating device according to claim 2, wherein the base body is made of quartz glass.

17. The heating device according to claim 4, wherein the base body is made of quartz glass.

18. The heating device according to claim 6, wherein the base body is made of quartz glass.

19. The heating device according to claim 7, wherein the base body is made of quartz glass.

20. The heating device according to claim 12, wherein the base body is made of quartz glass.

\* \* \* \* \*